C. W. RAYMOND.
GATE.
APPLICATION FILED SEPT. 24, 1907.
905,363.
Patented Dec. 1, 1908.
2 SHEETS—SHEET 2.
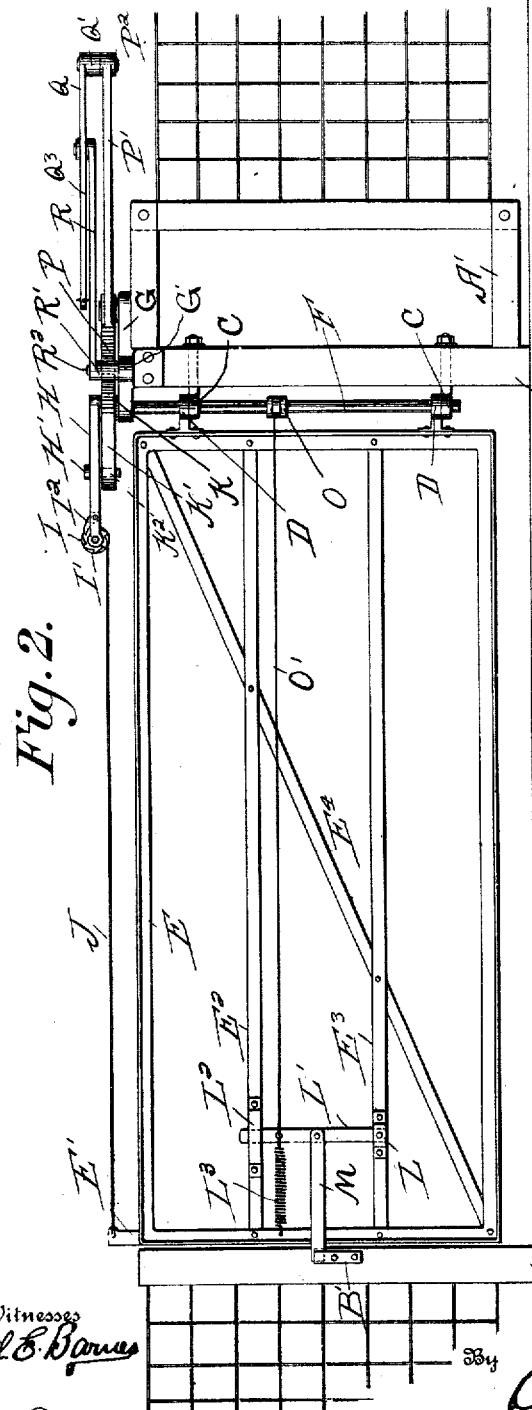
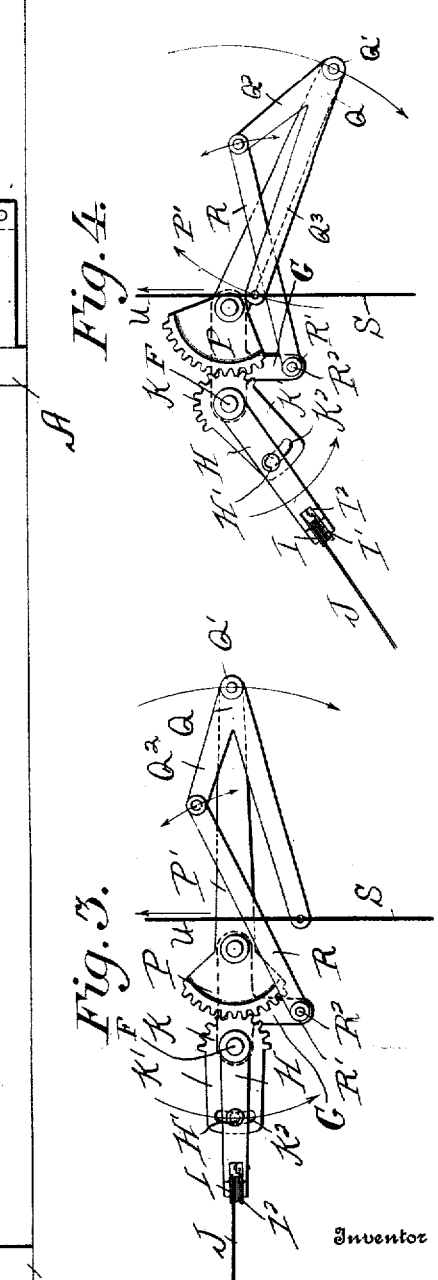
Witnesses
Phil E. Barnes
Rea P. Wright
Inventor
C. W. Raymond,
By Olmsted & Brock
Attorneys

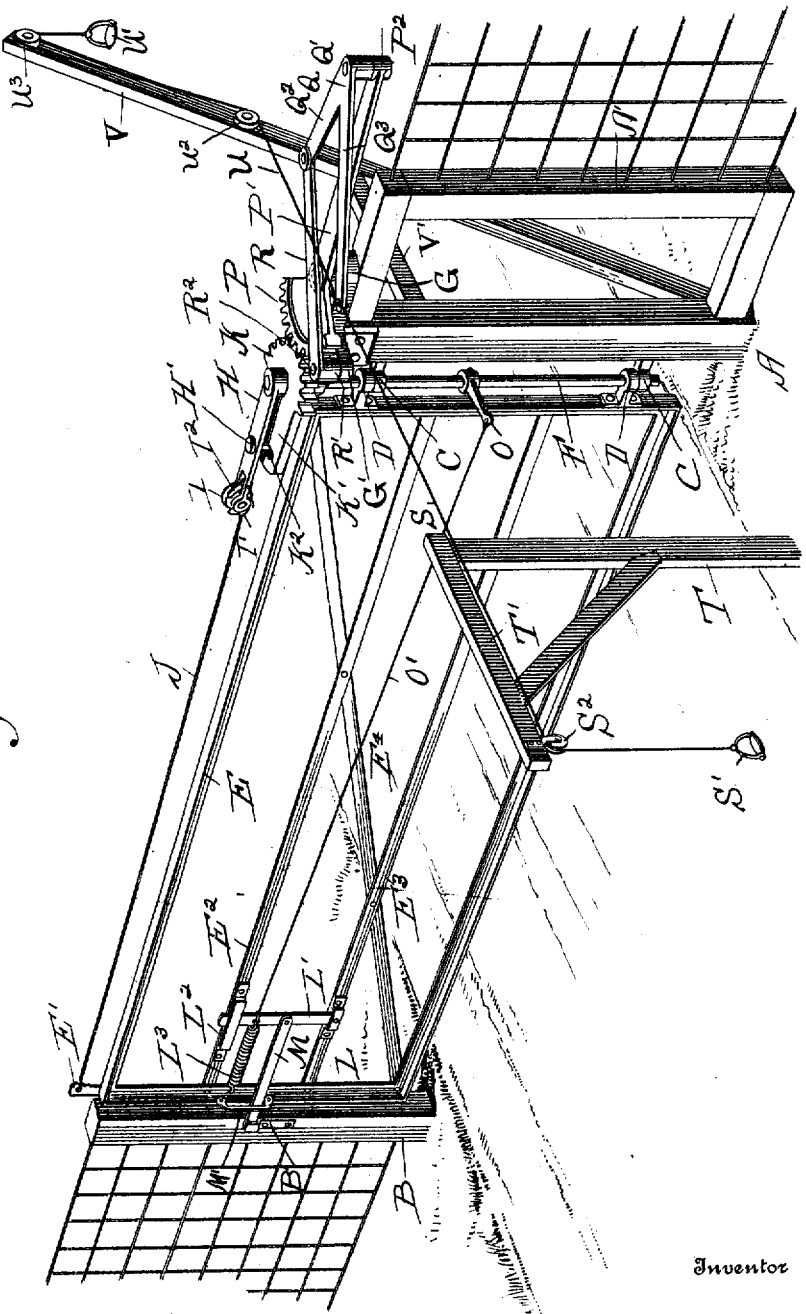

UNITED STATES PATENT OFFICE.

CHARLES W. RAYMOND, OF BROOKSTON, INDIANA.

GATE.

No. 905,363.  Specification of Letters Patent.  Patented Dec. 1, 1908.

Application filed September 24, 1907. Serial No. 394,280.

*To all whom it may concern:*

Be it known that I, CHARLES W. RAYMOND, a citizen of the United States, residing at Brookston, in the county of White and State of Indiana, have invented a new and useful Improvement in Gates, of which the following is a specification.

This invention relates to gates and more particularly to hand operating gates especially adapted to be used on country roads where it is impossible to plant a post, out in the road, the object being to provide a gate that can be opened from either side, but will swing only one direction.

With these and other objects in view, the invention consists in the novel features of construction, combination and arrangement of parts hereinafter fully described and pointed out in the claims.

In the drawings forming a part of this specification: Figure 1 is a perspective view of my improved gate. Fig. 2 is a side elevational view of the gate. Fig. 3 is a plan view of the operating mechanism showing it in its normal position. Fig. 4 is a plan view of the operating mechanism showing it moved so as to open the gate.

In the drawings A indicates a gate post arranged on one side of the road, having a frame A' secured to its rear side to which the end of the fence is secured, and B the gate-post on the opposite side of the road to which the fence is secured. The post A is provided with outwardly extending eyes C which register with eyes D carried by a gate E, and through which a shaft F is adapted to pass, forming a pintle. The shaft F is mounted in the apertured end of a plate G secured on the top of the post A, and frame A' and is provided with an arm H, at its upper end having a bifurcated end in which is mounted a reel I having a ratchet I' on its side adapted to be engaged by a pawl $I^2$. A wire cable J is secured on the reel having its free end secured to the apertured end of a bar E' extending up above the frame of the gate at its outer end, so that by tightening or loosening the cable, the swing of the arm H can be regulated.

Fixed on the shaft F between the plate G and arm H, is a segmental gear K provided with an arm K' having a slot $K^2$ adjacent its end in which works a depending pin H' of the arm H, so that the arm can turn a certain distance without moving the gear as will be hereinafter fully described.

The ends of the frame of the gate are connected together by spaced parallel bars $E^{2'}$, $E^3$, and a diagonal brace bar $E^4$ which prevents the gate from getting out of true. Secured to the lower bar $E^2$ is a bracket L, in which is mounted the lower end of an arm L' which works in a guide $L^2$ secured to the upper bar $E^3$ and is connected to the end of the frame by a coil-spring $L^3$. A latch-bar M is pivoted to the bar L' working in a guide M', secured to the end of the frame of the gate, and adapted to drop in a keeper B' secured to one side of the post B for locking the gate closed. An arm O is secured on the shaft F carrying a cable O' at its end which is connected to the arm L' so that when the shaft is turned, the latch will be lifted before the gate starts to swing, as will be hereinafter fully described.

Mounted on the plate G is a segmental gear P meshing with the gear K, provided with an arm P' having a sleeve $P^2$ at its end, on which is pivotally mounted the sleeve Q', of a crank arm Q which is provided with a short arm $Q^2$ having an apertured end to which the apertured end of the arm R is pivotally connected. The other end of the arm R is provided with a sleeve R' which is pivotally mounted on a pivot-pin $R^2$, secured to an enlarged portion G' of the plate G. The end of the long arm $Q^3$ of the crank arm Q is apertured, and to it is connected a cable S having a handle S' at its end, which passes over a pulley $S^2$ secured to the end of a supporting-arm T', carried by a post T arranged to one side of the post A, a sufficient distance, so that when the handle $S^2$ secured to the end of the cable, is pulled the gate can be opened without any danger of it coming into engagement with the horse. A cable U provided with a handle U' is also secured in the end of the apertured arm $Q^3$ which passes over the pulleys $U^2$ $U^3$ mounted on a pole V extending outwardly from the lower end of the other side of the post A, and is connected thereto by a base V', so that the handle can be readily grasped so that the gate can be opened from the other side.

The operation is as follows:—When it is desired to open the gate, say from the side that the pole V extends out from, the handle U will be grasped and pulled downwardly which will turn the gears P and K, causing the shaft to revolve which will lift the latch and as the end of the slot in the arm K' of the gear K, comes into engagement with the pin H' of the arm H, the gate will be swung opened. When it is desired to close the gate after passing through the same, the handle S is caught hold of and pulled which will swing the gate closed.

The gate swings in one direction only and can be opened from the other side by drawing upon the cable S. Assuming that the parts are in the position shown in Fig. 3, when the cable S is pulled upon there will be a rotation of the gear segments P and K in a direction the reverse of that when the cable U was operated, but such reverse rotation will continue only until the arms R and Q² are in alinement when the dead center of the pivotal point connecting the arms P' and Q² is reached. The rotation of the gears will then cease, temporarily, and during this brief reverse rotation of the gear segments there will be no swinging movement of the gate as the slot K² is of such length as to permit the arms to pass dead center without moving the gate. But as the dead center is passed and the arms then form an angle with each other the reverse of that shown in Figs. 3 and 4, the gear segments P and K will again be rotated, but in the same direction as when the cable U was pulled, and as soon as the gate is unlatched and the pin H' has traveled the length of the slot K² the gate will again swing open, and in the same direction as when the cable U was pulled. It will be obvious, therefore, that either cable S or U may be pulled for the purpose of opening the gate, and no matter which cable is pulled, the gate will open in one direction only.

Having thus fully described my invention, what I claim as new and desire to secure by Letters Patent is:—

1. A device of the kind described comprising a gate arranged to swing in one direction, a rotatable shaft upon which said gate is loosely mounted, a segmental gear fixed to said shaft and provided with a slotted arm, an arm loosely mounted upon said shaft, a pin carried by said arm and extending into said slot, means connecting said arms to the gate, a segmental gear meshing with the gear carried by the shaft, and means for imparting a partial rotation in one direction to the last mentioned gear from either side of the gate.

2. The combination with a post having a gate hinged thereto, said hinge comprising a pintle shaft having a segmental gear at its upper end, said gear having a slotted arm, an arm carried by said shaft provided with a pin working in said slot, a cable connecting said arm to the end of the gate, means for adjusting the tension upon said cable for the purpose of regulating the swing of the last mentioned arm, a lever arm fixed upon the shaft, a spring actuated catch carried by the gate, connecting means between the lever arm and the catch, and means for operating the gear carried by the shaft from either side of the gate.

3. In a device of the kind described a segmental gear, an arm extending from said gear, an angle arm comprising a long and a short arm, said angle arm being pivotally connected to the free end of the arm of the gear segment at the point of juncture of the long and short arms, an arm pivotally connected at one end to the short arm of the angle arm, and pivoted at its opposite end to a fixed support, operating cables connected to the free end portion of the long arm, and means for transmitting rotation of the segmental gear in one direction only to the gate.

4. A device of the kind described comprising a gate post, eyes carried by said post, a gate, eyes carried by the gate, a shaft extending through said eyes, a gear carried by the shaft, a gear mounted on said post meshing with said gear, an arm carried by said gear on the post, a crank mounted on the end of said arm, a link connected to the short arm of said crank pivotally mounted on said post, and operating cables connected to the end of the long arm of said crank, for the purpose described.

CHARLES W. RAYMOND.

Witnesses:
 JOHN J. CAIN,
 THOMAS CAIN, Jr.